United States Patent

Base et al.

[11] Patent Number: 6,003,789
[45] Date of Patent: Dec. 21, 1999

[54] NOZZLE FOR ATOMIZING LIQUID IN TWO PHASE FLOW

[75] Inventors: Terence E. Base, London; Edward W. Chan, Edmonton; R. Douglas Kennett; Douglas A. Emberley, both of Fort McMurray, all of Canada

[73] Assignees: AEC Oil Sands, L.P.; AEC Oil Sands Limited Partnership; Athabasca Oil Sands Investments Inc.; Canadian Occidental Petroleum Ltd.; Canadian Oil Sands Investments Inc.; Gulf Canada Resources Limited; Imperial Oil Resources, all of Calgary, Canada; Mocal Energy Limited, Tokyo, Japan; Murphy Oil Company Ltd.; Petro-Canada, both of Calgary, Canada

[21] Appl. No.: 08/990,748

[22] Filed: Dec. 15, 1997

[51] Int. Cl.$^6$ ........................................................ B05B 7/04
[52] U.S. Cl. .............................. 239/433; 239/8; 239/398; 239/426; 239/432; 239/589
[58] Field of Search ................................ 239/8, 398, 426, 239/432, 433, 434, 589, 590

[56] References Cited

U.S. PATENT DOCUMENTS

| | | |
|---|---|---|
| 3,565,593 | 2/1971 | Moore Jr. . |
| 4,086,772 | 5/1978 | Williams . |
| 4,097,366 | 6/1978 | Tanaka et al. . |
| 4,103,827 | 8/1978 | Kumazawa ................................. 239/8 |
| 4,134,547 | 1/1979 | Gamst . |
| 4,426,213 | 1/1984 | Stavropoulos . |
| 4,650,566 | 3/1987 | Buyan et al. . |
| 4,824,016 | 4/1989 | Cody et al. ................................. 239/8 |
| 5,004,152 | 4/1991 | Baker et al. . |
| 5,092,981 | 3/1992 | Russo . |
| 5,108,583 | 4/1992 | Keon . |
| 5,300,216 | 4/1994 | Hertzberg et al. . |

FOREIGN PATENT DOCUMENTS

| | | | |
|---|---|---|---|
| 610853 | 8/1954 | European Pat. Off. .................... | 239/8 |
| 21827 | 1/1947 | Finland .................................. | 239/589 |
| 1278618 | 11/1989 | Japan .................................... | 239/589 |

OTHER PUBLICATIONS

Elements of Gasdynamics, by H.W. Liepmann et al., Galcit Aeronautical Series, J. Aeronaut, Sci., 20 (1953), 617, pp. 131–136.

Compressible Fluid Flow, by Patrick H. Oosthuizen et al., The McGraw-Hill Companies, Inc., Chapter 8: Variable Area Flow, pp. 211–213.

Osborne Reynolds and Engineering Science Today, Jack Allen et al., Manchester University Press, Barnes & Noble, Inc., New York, pp. 152–154.

Propagation Velocity of Pressure Waves in Gas–Liquid Mixtures, Henry et al., pp. 1–6.

*Primary Examiner*—Andres Kashnikow
*Assistant Examiner*—Robin O. Evans
*Attorney, Agent, or Firm*—Millen, White, Zelano & Branigan, P.C.

[57] ABSTRACT

Mixing means, for producing a flow mixture of oil and steam, is combined with an atomizing nozzle to provide a nozzle assembly which produces a jet of very fine oil droplets. The nozzle assembly is used in conjunction with a reactor, such as a fluidized bed coker. The mixing means comprises a pipe, external of the reactor, having separate, spaced apart inlets for oil and steam. The steam inlet is upstream of the oil inlet. A reducing diameter nozzle is positioned in the pipe bore between the inlets, for accelerating the steam. The steam contacts the oil and turbulently moves down the pipe bore to produce what is known as a "bubbly flow" mixture. The mixture is fed to the nozzle, which is internal of the reactor. The nozzle has: an inlet; a first contraction section of reducing diameter for accelerating the flow, preferably to supersonic velocity, whereby the droplets are reduced in size; a diffuser section of expanding diameter wherein the mixture decelerates and a shock wave may be induced; a second contraction section operative to accelerate the mixture more than the first contraction section; and an orifice outlet for producing a jet or spray. The nozzle assembly has been shown to reduce droplet size from about 12,000 $\mu$m to about 300 $\mu$m.

14 Claims, 8 Drawing Sheets

NOZZLE FOR ATOMIZING LIQUID IN TWO PHASE FLOW

FIELD OF THE INVENTION

The present invention relates to a nozzle assembly for producing and atomizing a mixture of oil and steam, for injection into the chamber of a reactor, such as a fluidized bed coker. The nozzle assembly comprises mixing means, external of the reactor, for producing a bubbly flow mixture of oil and steam, and an atomizing nozzle, internal of the reactor, for converting the mixture into a jet of fine liquid droplets. The invention also relates to the process involved in use of the assembly.

BACKGROUND OF THE INVENTION

Dry bitumen liquid is obtained from oil sands and is further processed in a fluidized bed coker to produce low-boiling petroleum products. The efficacy of this coking process depends upon effective and rapid heat transfer from the fluidized bed solids of the coker to the bitumen feed. This can be enhanced by introducing the bitumen into the coker in the form of fine liquid droplets, thereby significantly increasing the surface area of the bitumen. The greater the surface area, the more effective and rapid the heat transfer to the bitumen. In addition, better heat transfer is achieved if the cross-sectional coverage area of the droplets is increased. The formation of a wide spray of evenly distributed fine bitumen droplets will increase the desired liquid distillate products and decrease the undesired by-products, namely, gas make and coke make.

The bitumen feed is conventionally mixed with steam to produce a two phase mixture and this mixture is injected into the fluid coker through nozzles. The nozzles induce some atomization of the bitumen so that a spray or jet of bitumen droplets is injected into the coker. However, it is our belief that the commercial nozzles available only atomize a portion of the bitumen. We have tested the prior art nozzles used in the present assignees' fluid coker using water and steam as the feed—the indication is that 70–90% of the liquid passed through the nozzle is in a non-atomized form. In addition, the average mean diameter of the atomized liquid droplets produced in the test were in the order of 400 $\mu$m for an air to liquid ratio (ALR) value of 0.008; this is larger than desirable for optimal coking of the bitumen to occur.

One aim of the present invention is to provide an improved nozzle that atomizes most of the liquid processed into evenly distributed fine droplets, resulting in desirable droplet surface area of the bitumen when it is subjected to the coking process.

In service, nozzles used to atomize the bitumen feed are subject to high wear rates and a high degree of plugging. Therefore it is desirable to ensure that a nozzle not only atomizes the bitumen effectively but is also erosion resistant in order to minimize replacement and repair costs. This can be achieved by designing a nozzle assembly with a minimum of internal parts. In addition, the nozzle assembly should be "roddable" so that it may be unplugged with a rod.

It is also desirable that a nozzle design be effective over a broad range of gas/liquid ratios because the bitumen feed rate is variable.

It is further desirable that the pressure drop required for achieving satisfactory atomization is not excessive.

The literature teaches that several flow mechanisms can have an effect on reducing liquid droplet size in two phase flow. More particularly it is known:

That longitudinal vibration of stretched liquid droplets (referred to as "ligaments") can cause reduced diameter at the nodal points and corresponding "necking", which can lead to droplet break-up and formation of finer droplets (this is referred to as the "Rayleigh instability");

That longitudinal stretching or straining of a liquid droplet by an accelerating carrier fluid flow can lead to droplet break-up. Otherwise stated, situating droplets of one fluid in another fluid undergoing acceleration can cause the droplets to undergo shear. When the shear forces overcome surface tension forces, the droplets will deform and can break up (this is referred to as the "elongation effect");

That mean and fluctuating shear stresses applied to larger droplets can cause the droplets to rotate, then stretch and ultimately divide into smaller droplets. Mean shear effects and stresses can be induced in droplets by turbulent flow and fluctuations of the carrier phase (the "Reynolds stress effect");

That droplets can collide with each other or an impact surface and break up if generated internal stress exceeds surface tension effects; and That droplets passing through a supersonic shock wave can break up due to the effect of the sudden pressure rise.

It is the objective of the invention to provide a nozzle assembly, free of moving parts, which can be "rodded" to unplug it and which is designed to incorporate some or all of the previously mentioned flow mechanisms, to combine in efficiently breaking up large liquid droplets in a two phase flow.

It is to be understood that, while the nozzle was developed for service with fluid cokers in the petroleum refining field, it is anticipated that it will find application in other fields where atomizing nozzles are used.

SUMMARY OF THE INVENTION

The present invention is concerned with producing a bubbly flow stream of a mixture of heavy oil and steam and atomizing the mixture. The mixture is a pumped flow or stream in which the oil is present as relatively large droplets, typically ranging in dimension between 6,000 $\mu$m (¼") to the internal diameter of the supply pipe in dimension. The objective is to reduce the average mean diameter of the droplets to a relatively fine size, typically in the order of 300 $\mu$m. It has been proven that the highest probability of collision of bitumen or heavy oil droplets with heated coke particles occurs when both bitumen droplets and heated particles have similar diameters; thus a droplet size of 200 or 300 $\mu$m is desirable.

To achieve this, a nozzle is used having a longitudinal bore or flow passageway of circular cross-section comprising in sequence: an inlet; a first contraction section of reducing diameter; a diffuser section of expanding diameter; a second contraction section of reducing diameter; and an orifice outlet. The contraction sections accelerate the flow mixture and induce droplet size reduction by elongation and shear stress flow mechanisms. The second contraction section is designed to accelerate the mixture flow more than the first contraction section. As a result, the fine droplets produced by the first contraction are further reduced in size in the second contraction. The diffuser section allows the mixture to decelerate and slow down before being accelerated a second time.

Advantage is taken of the fact that, for a two-phase flow of liquid droplets and gas, the speed of sound in the mixture is reduced in value to a fraction of either the single-phase values of the gas or the liquid. The reason for this is that the square of the speed of sound in a media is the ratio of the adiabatic bulk modulus (liquid) or pressure (gas) divided by the density times a constant of the fluid properties which in the case of a gas (k=cp/cv). In the case of the two phase mixture, the mixture assumes the pressure value of the gas and the density assumes the mixture density. For a two phase flow this usually results in a relatively small numerator, the gas pressure, and a relatively larger denominator, the mixture density. Hence a much lower value, for the speed of sound of the mixture, is obtained. In fact the speed of sound in the mixture is lower than either value for the individual gas or liquid phases. This means that, for two-phase nozzle flow, for quite a low mixture velocity, the nozzle flow can be supersonic.

It has been shown by experiment that this assumption for the low value of the speed of sound in a mixture of a liquid and a gas is only true if the flow pattern in the nozzle is of the bubbly flow type.

The nozzle is therefore preferably designed in accordance with the following criteria:

the first contraction section should accelerate the mixture to supersonic velocity—the possibility is then created for generating a flow of relatively small droplets such as in "bubbly" flow due to the elongation of the flow and secondly generating a shock wave in the diffuser due to the lower speed of sound value. If a shock wave is created, it will assist in droplet size reduction;
- as previously stated, the second contraction section should accelerate the mixture more than that achieved by the first section. We successfully used a section that provided about twice the acceleration. If the fine droplets produced by the first contraction and diffuser sections are to be further reduced in size, it is necessary to subject them to relatively increased elongation and shear stress; and
- the diffuser section should increase the diameter of the flow passageway sufficiently so that the desired acceleration in the second contraction section can be achieved. However the length of the section needs to be limited to avoid excessive recombination of droplets. We found a 3° section to be satisfactory while a 6° section, total angle, was much less useful.

By applying the configuration of tandem contraction sections separated by a diffuser section and observing the aforementioned criteria in the design of the sections, we produced a nozzle which satisfactorily reduced relatively large water ligaments of 12,500 $\mu$m average mean diameter, present in an air/water mixture, to relatively fine droplets having an average mean diameter of 300 $\mu$m, produced in the form of a jet having substantially evenly distributed droplets.

In adapting the nozzle to service in a fluid coker, where it was to process a steam and bitumen mixture, it was desirable to provide a more active mixing or pre-conditioner means. The bitumen, a viscous heavy oil, arrives at the coker in the form of a hot, pumped stream in a pipe. It is necessary to convert the mixture into a bubbly flow condition. This was accomplished using the following means:

- a straight pipe closed at one end by a valve and connected at the other end with the nozzle;
- a pre-conditioning nozzle of reducing diameter positioned coaxially in the pipe bore between its ends;
- an inlet upstream of the nozzle, for introducing the steam; and
- an inlet, close to and downstream of the nozzle, for introducing the bitumen.

The steam jets out of the pre-conditioning nozzle and contacts the entering slug of bitumen, breaking it up into ligaments. The fast-moving steam mixes with the bitumen and further breaks up the ligaments, mainly by elongation and shear stress, to partially reduce them in size, as the mixture moves turbulently down the pipe. The pipe is not long—for most efficient use we suggest a length of 10 diameters between the pre-conditioner nozzle and the atomizing nozzle entrance. However, due to practical constraints, this distance may be longer. The combination of steam jetting, turbulence and shear is intended to produce a stream in the condition of "bubbly flow".

The invention is characterized by the following advantages:

- use of the nozzles and active mixing means in connection with a commercial fluid coker demonstrated improved upgraded oil yield;
- the nozzle has been shown to be capable of reducing the majority of water droplets in a water/air mixture from about 12,000 $\mu$m in the feed to about 300 $\mu$m in the jet product and the fine droplets are evenly distributed in the product jet; and
- the nozzle is free of working parts and is roddable.

Broadly stated, in one aspect the invention comprises, in combination: a reactor forming an internal reaction chamber and having a side wall forming an opening; and a nozzle assembly comprising a mixing means, external of the reactor, and an atomizing nozzle, positioned within the reactor chamber and connected with the mixing means through the opening; the mixing means comprising a pipe connected with the atomizing nozzle and having an internal bore, the pipe having first inlet means for introducing a stream of oil under pressure into the pipe bore upstream of the reactor opening and second inlet means for introducing a stream of steam under pressure into the pipe bore upstream of the first inlet means, a pre-conditioning nozzle, having a bore of reducing diameter, positioned transversely of the pipe bore between the first and second inlet means, for accelerating the steam as it passes therethrough so that the steam may contact the oil and produce a flow mixture of steam and oil, and valve means, upstream of the second inlet means, operative to close the pipe bore or enable the introduction of rodding means; and the atomizing nozzle comprising a body forming a passageway extending therethrough, said passageway having upstream and downstream ends and comprising the following in sequence, an inlet for introducing the flow mixture, a first contraction section of reducing diameter for accelerating the mixture to supersonic velocity to reduce droplet size by elongation and shear stress, a diffuser section of expanding diameter for allowing the mixture to decelerate and to enlarge the cross-sectional area of the passageway so that sufficient acceleration may be attained in the next contraction section to further reduce droplet size, a second contraction section of reducing diameter for accelerating the mixture with greater acceleration than in the first contraction section to further reduce droplet size by elongation and shear stress and an orifice outlet for discharging the mixture in the form of a jet of relatively fine oil droplets distributed in the steam.

In another aspect, the invention comprises a method for atomizing heavy oil to be injected into the reaction chamber of a reactor, comprising: forming a bubbly flow mixture stream of oil and steam in mixing means external of the reactor; and reducing the size of droplets by passing the mixture stream through a nozzle passageway in the reaction chamber, said passageway comprising, in sequence, an inlet section, a first contraction section, a diffuser section, a second contraction section and an orifice outlet, so that the mixture stream is introduced into the passageway and accelerated in the first contraction section to reduce droplet size by elongation and shear stress, then decelerated and cross-sectionally enlarged in the diffuser section, then accelerated a second time in the second contraction section, with greater acceleration than in the first contraction section, to further reduce droplet size by elongation and shear stress, and finally discharged through the outlet section into the reactor chamber as a jet of relatively fine oil droplets distributed in steam.

DESCRIPTION OF THE DRAWINGS

FIG. 1 is a cross-sectional side view of the nozzle showing, in fanciful form, the progression of liquid droplet diminution in the course of passage through the nozzle, as understood by the inventors;

FIG. 2 is a cross-sectional side view of the nozzle used in water/air tests described below—the dimensions of the nozzle are set forth in Table I;

FIG. 3 is a schematic plan view showing the nozzle of FIG. 2 attached to a pre-conditioning or mixing means to form a nozzle assembly;

FIG. 4 is a cross-sectional side view of the nozzle used in connection with a fluid coker vessel—the dimensions of the nozzle are set forth in Table II;

FIG. 5 is a schematic plan view showing the nozzle of FIG. 4 attached to a mixing means to form a nozzle assembly;

FIG. 6 is a side view showing the nozzle assembly of FIG. 5 connected to a fluid coker;

FIG. 7 is a side view showing the pre-conditioning nozzle of FIGS. 5, 6—the dimensions are set forth in Table III;

FIG. 8 is a graph setting forth the Sauter mean diameter of the water droplets produced by the nozzle of FIG. 2, plotted against air/water ratio;

FIGS. 9 and 10 are videographs showing the droplet size and pattern of the jet produced in the water/air tests using a prior art nozzle at different view points downstream; and FIGS. 11 and 12 are videographs showing the droplet size and pattern of the jet produced in the water/air tests using the nozzle of FIG. 4 at different view points downstream.

DESCRIPTION OF THE PREFERRED EMBODIMENT

The invention will now be described in connection with a nozzle 1 used to atomize water in air. The nozzle 1 is shown in FIG. 3. Its dimensions are set forth in Table I below.

The nozzle assembly 3 comprised a tee mixer 2 threadably connected with a nozzle 1. The tee mixer 2 comprised a 0.957" I.D. straight pipe 4. Air under pressure from a compressor (not shown) was introduced axially into the bore 5 of the pipe 4. Water was introduced into the pipe bore 5 through a tee connection 6.

The nozzle 1 comprised a body 7 forming a longitudinal passageway 8 extending therethrough. The passageway 8 comprised, in sequence: an inlet section; 9; a first contraction section 10; a diffuser section 11; a second contraction section 12; and an orifice outlet section 13.

The dimensions of nozzle 1 are set forth in Table I, now following:

TABLE I

| | |
|---|---|
| a | 1.938" |
| b | 4.823" |
| c | 0.722" |
| d | 2.384" |
| e | 0.862" |
| f | 0.616" |
| g | 0.250" |
| h | 0.512" |

In the analytical design of the nozzle to achieve the desired results, the first analysis is to determine the droplet diameter entering the first nozzle contraction. This is obtained by considering theory for the break-up of liquid ligaments due to turbulent flow. The theory is applied to the constant diameter pipe section from the point of the first mixing of the bitumen and steam up to the entry to the nozzle. To apply the theory the turbulent Reynolds stresses have to be calculated for the turbulent pipe flow and used in an equation that predicts the break-up of the droplets and corresponding new droplet diameters.

The break-up of the bitumen droplets in the first contraction to smaller droplets is also estimated by another equation. The smaller droplet diameter produced by the accelerated flow in the contraction depends on the third root of the product of the surface tension coefficient of the bitumen times the original diameter divided by the product of the bitumen density times the estimated acceleration of the bitumen droplet. The acceleration of the bitumen is obtained by considering the geometry of the contraction and two-phase flow theory. For example, it can be shown that for a flow of bitumen and steam at typical temperature and pressure for the fluidized bed coker for a flow rate of 1620 barrels per day and a steam flow rate of 103 lb./hr., if the initial diameter of the bitumen droplet is 12,120 $\mu$m, over a length of 30 diameters the bitumen droplets reduce in size to 4,210 $\mu$m. On entering the first contraction of the nozzle the acceleration of the mixture and elongation of the bitumen droplets causes the droplet diameter to reduce further to 618 $\mu$m. For this part of the analysis a contraction ratio of 0.286 was assumed over a length of 49.52 $\mu$m (1.808"). To determine the final diameter of the droplet from the complete nozzle, this analysis has to be repeated for the second contraction.

During this analysis, the speed of sound for the mixture has to be determined and the mixture Mach number also calculated for the first contraction. The mixture Mach number is the mixture velocity divided by the mixture speed of sound. If the mixture Mach number is equal to unity, then the flow downstream of the contraction could be supersonic and an additional mechanism, to break-up the bitumen to smaller droplets, will be applied. The only differences between the supersonic nozzle flow in the proposed nozzle and the usual theory for single phase flow is that in this study the flow media is a two-phase mixture of bitumen droplets in steam flow and the nozzle is a double nozzle with two contractions. Criteria has been developed to determine the necessary and sufficient conditions for axi-symmetrical shock waves to occur in the diffuser or outside of the nozzle in the turbulent jet region. For a distribution of bitumen droplet sizes it is best to employ a software program for this analysis.

In testing nozzle 1, the following conditions were observed:

water flow rate: 15 USGPM–52 USGPM airflow rate: 20 SCFM–140 SCFM

These conditions were used to mimic the real life situation where liquid feed rate varies. The tests were performed at atmospheric pressure at a temperature of 15° C.

It was observed through a transparent window that the feed mixture entering the nozzle 1 comprised water ligaments dispersed in the air. The droplet size and distribution in the jet produced were determined in the following manner. New methods for measurement and characterization were developed to obtain data in the near-field of the spray from the nozzle tip to three feet downstream; laser interferometry and high-speed strobe imaging methods were developed and employed successfully to characterize that near-field spray. To minimize any bias of measurement, the orientation of the pre-conditioner and nozzle assembly was changed to a vertical one with the spray projected downwards in a spray tower. The laser interferometry provides a non-invasive technique for measuring velocities and droplet sizes. No probes are introduced into the flow and thus it retains all the droplet sizes and flow field. Furthermore no calibration of the instrument is necessary. The instrument made use of an argon ion laser light source and the only disadvantage of the system was that in very dense sprays or non-dispersed sprays, the light burst may be too diffused and may not distinguish the true signal from the background noise. In summary four main tests were made of the design nozzles in the vertical flow test chamber as follows:

1. P.D.A. measurements;
2. high speed strobe light illuminated videography;
3. visual inspection using a SW laser light sheet source; and
4. spray flux determination using paternation sampling equipment.

Figure 9:
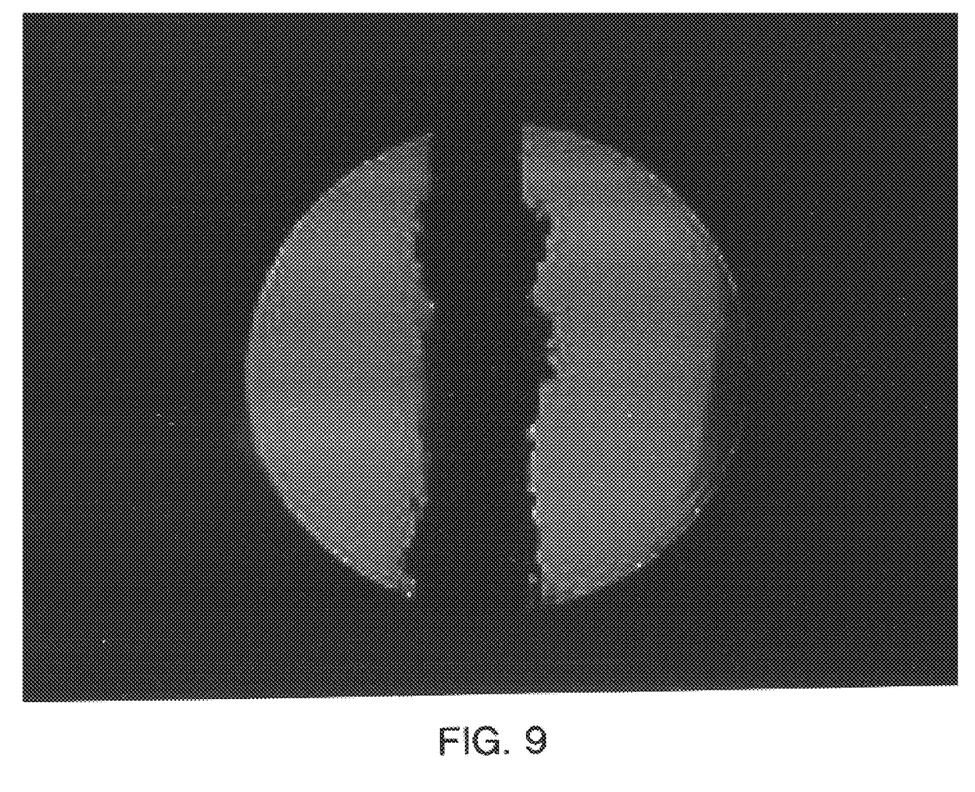
Figure 10:
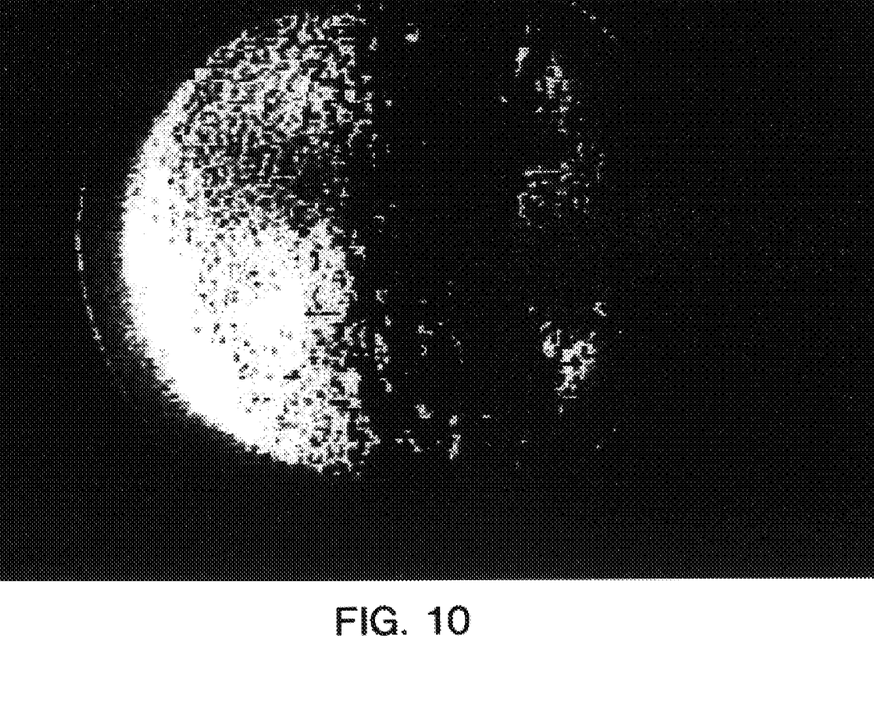

Videograms are shown in FIGS. 9 and 10 of spray patterns that were taped using a prior art commercial nozzle supplied with a fluidized coker operated by the present assignees. The nozzle was operated at 50 USGPM, air fed at 150 psig and the views were taken at 10" and 36" downstream, respectively. The videograms indicate a dense liquid core. In this flow, liquid ligaments were present with little indication of atomization.

Figure 4:
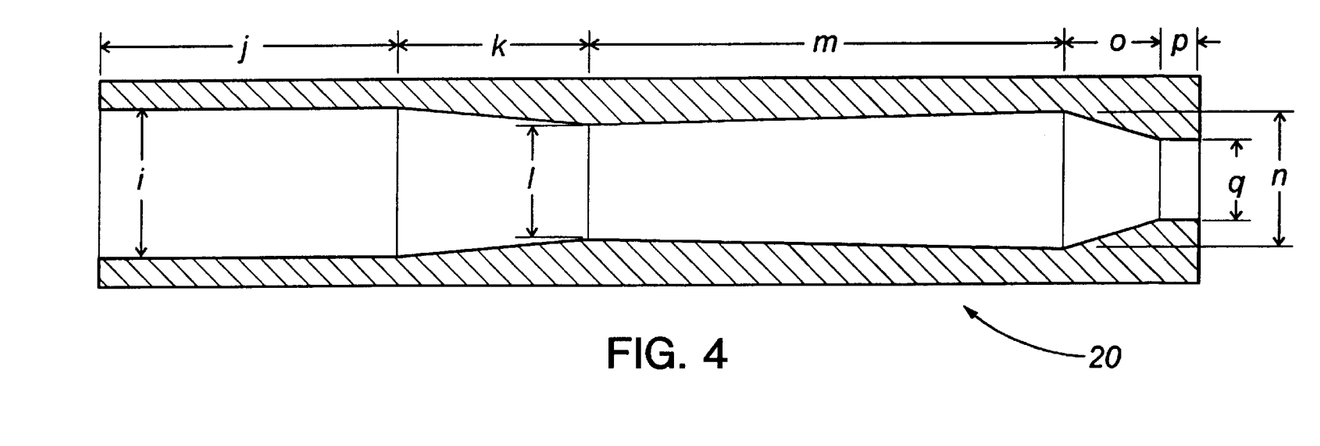
Figure 11:
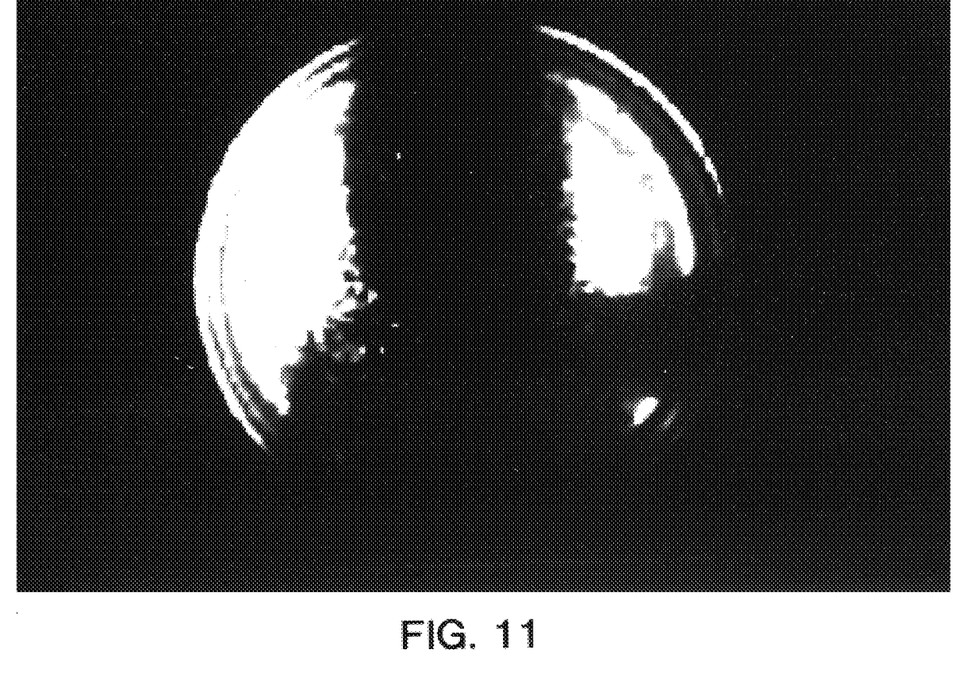
Figure 12:
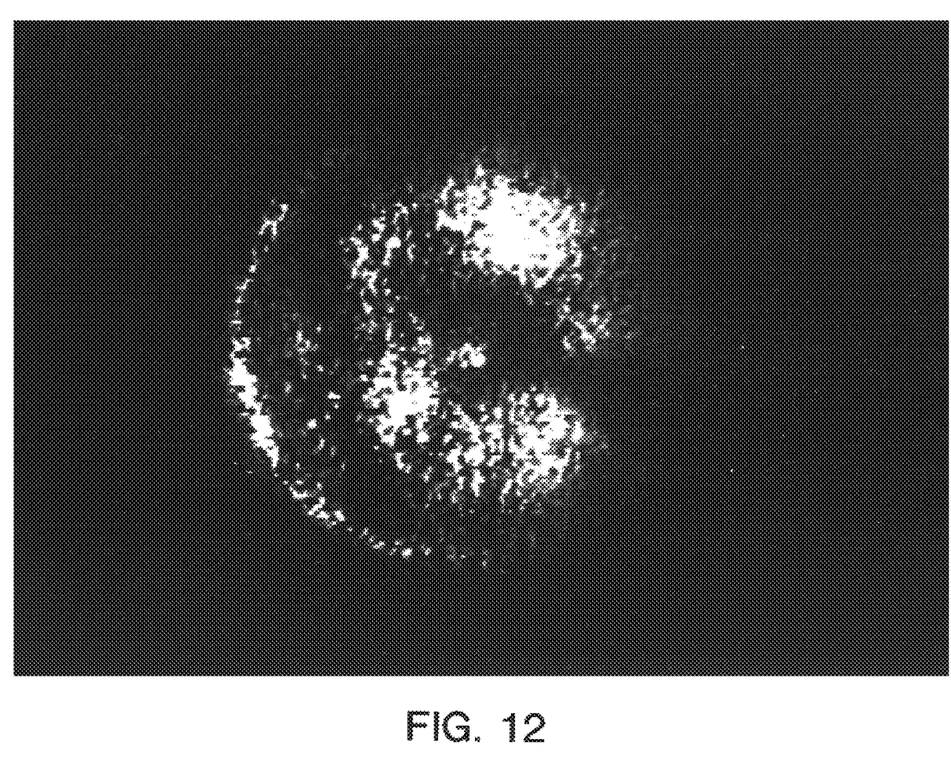

Videograms are shown in FIGS. 11 and 12 of spray patterns that were taped using the nozzle of FIG. 4 at distances of 10" and 36" downstream. Much greater width and liquid break-up was observed.

The Sauter average mean diameter of the fine droplets produced by the nozzle of FIG. 4 was 250–350 μm. About 90% of the water processed was in the form of fine droplets.

Figure 1:
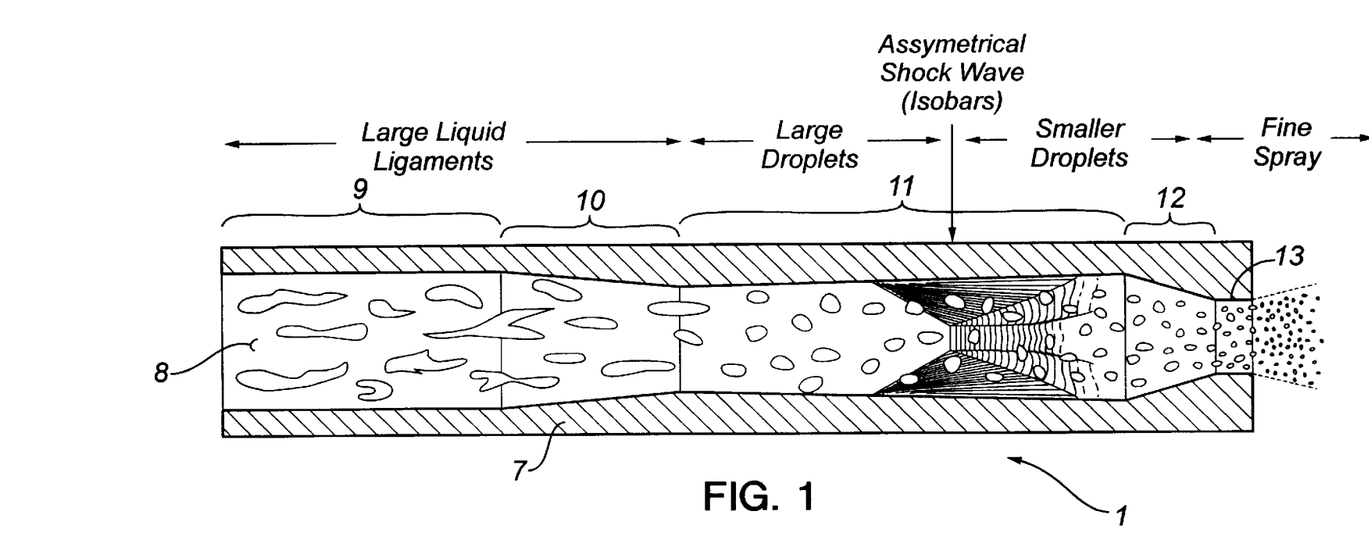
Figure 2:
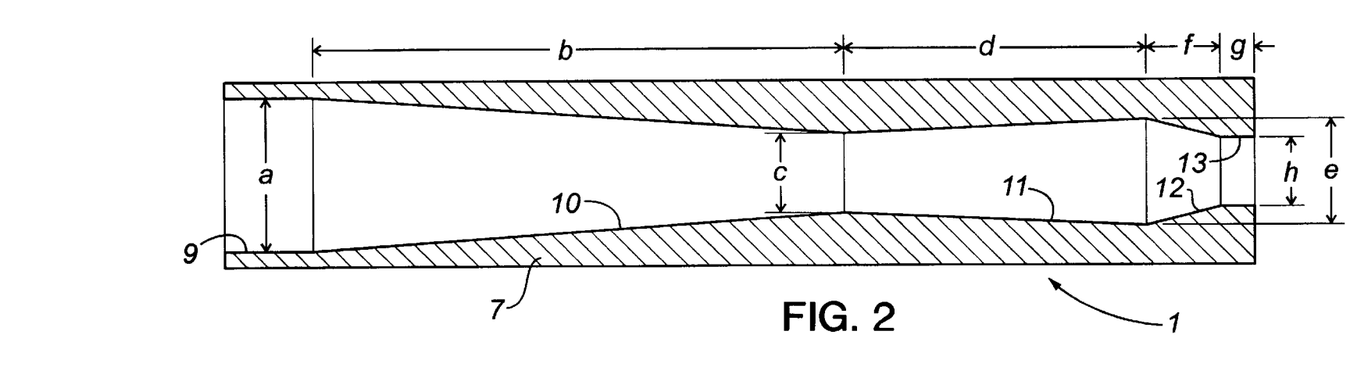
Figure 3:
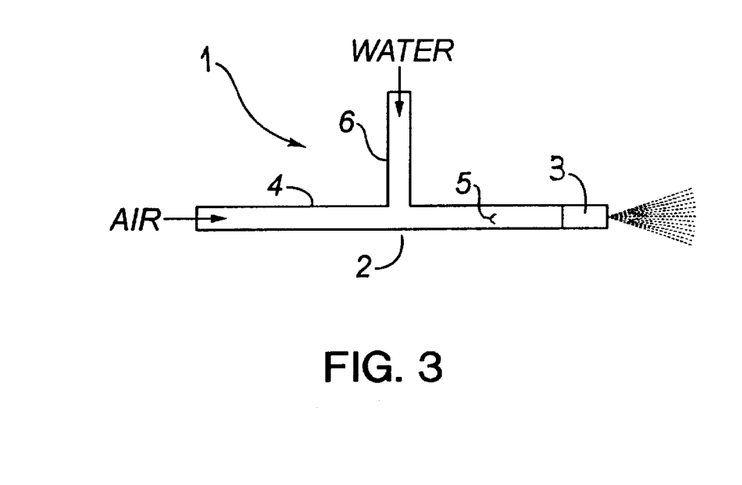
Figure 5:
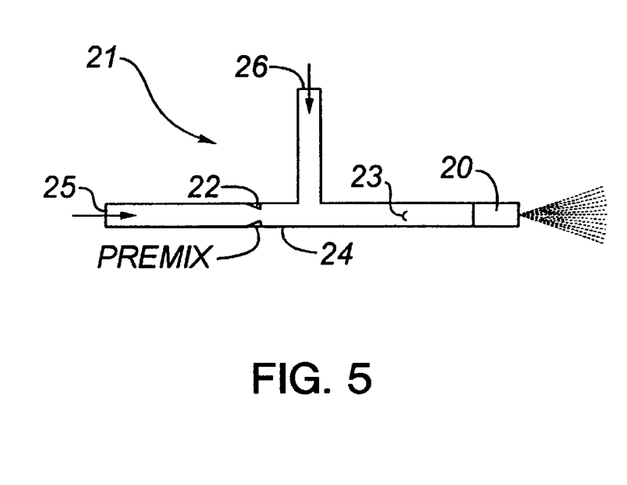
Figure 6:
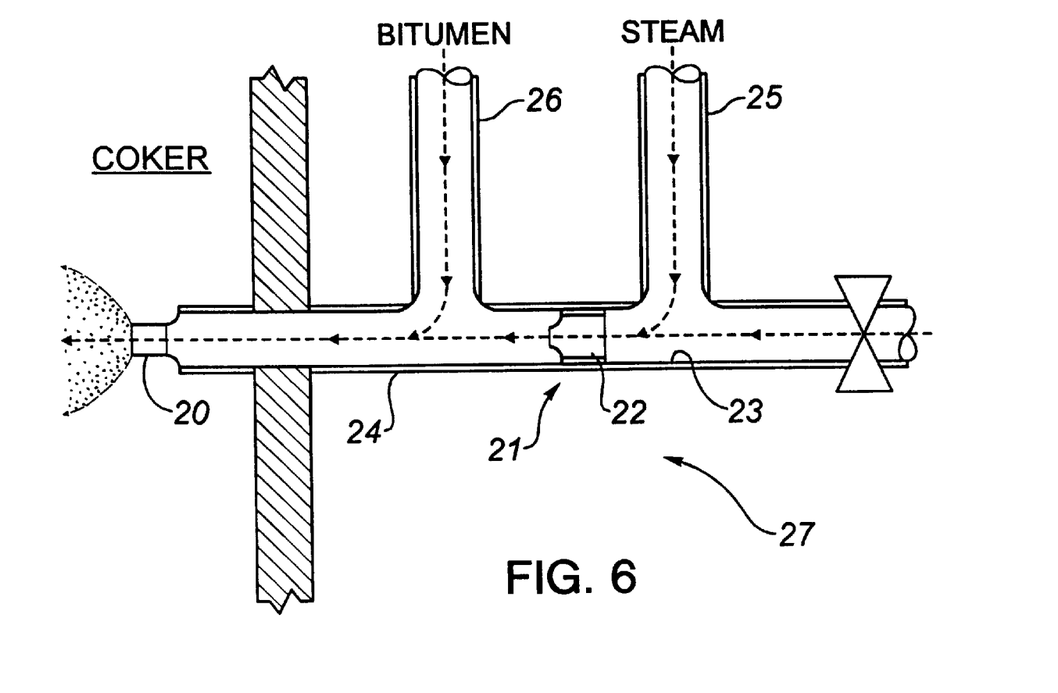
Figure 7:
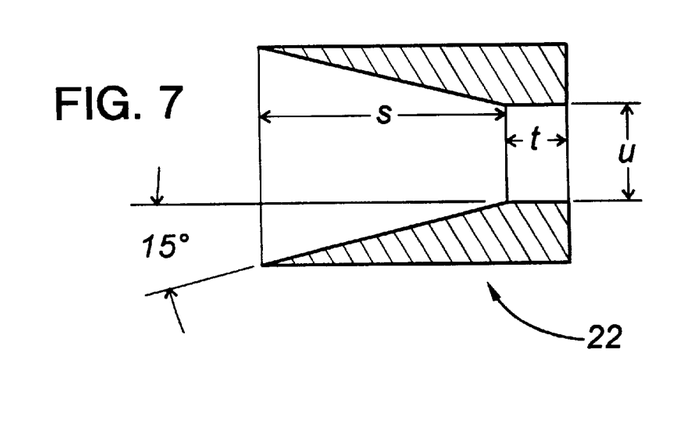
Figure 8:
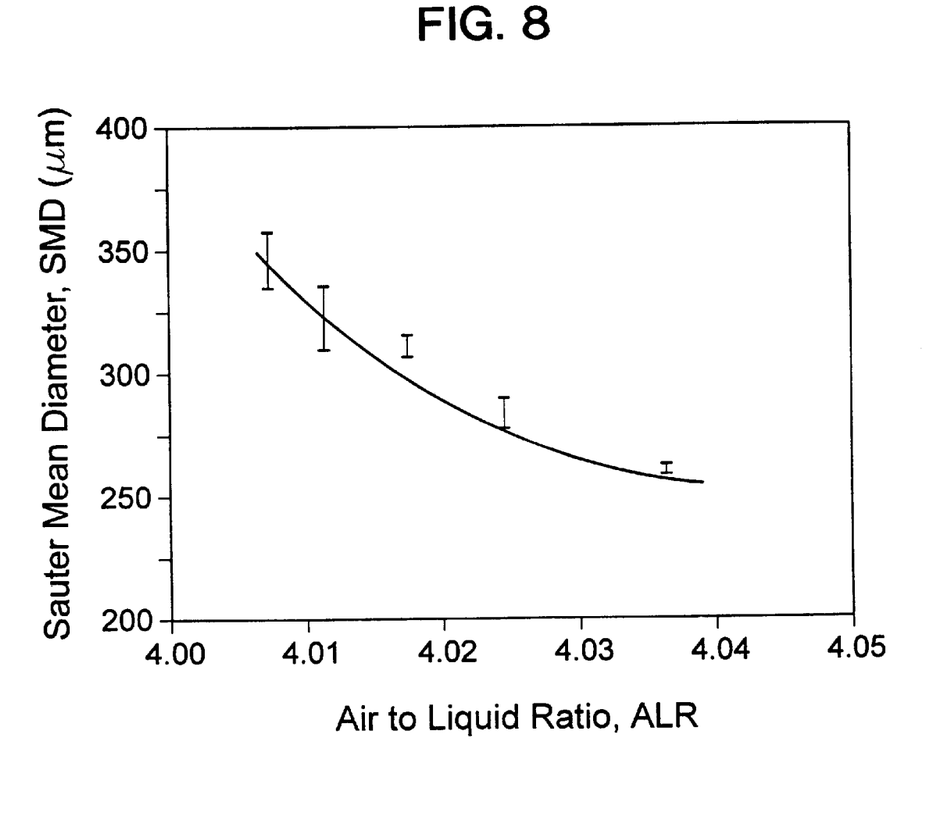

The invention was also tested in a commercial coker using the nozzle shown in FIGS. 4 and 5. The nozzle openings in the coker were relatively small. The nozzle dimensions were modified to meet the limitation in outside diameter, although the same criteria were used in the nozzle's design as was the case for the nozzle of FIG. 2. The dimensions of the nozzle 20 are set forth in Table II, now following.

TABLE II

| | |
|---|---|
| i | 0.957" |
| j | 1.925" |
| k | 1.25" |
| l | 0.612" |
| m | 3.00" |
| n | 0.880" |
| o | 0.825" |
| p | 0.250" |
| q | 0.512" |

To provide a better flow mixture for the nozzle 20, a pre-conditioning assembly 21 having a contraction nozzle 22 mounted in the bore 23 of the pipe 24, was provided. The pre-conditioning nozzle 22 was positioned downstream of the steam inlet 25 and immediately upstream of the bitumen inlet 26. The dimensions of the pre-conditioning nozzle 22 are set forth in Table III, now following.

TABLE III

| | |
|---|---|
| r | 0.936" |
| s | 1.000" |
| t | 0.250" |
| u | 0.400" |

A number of the nozzle assemblies 27 were used in a commercial fluid coker and worked without problem to improve coker product yield.

The embodiments of the invention in which an exclusive property or privilege is claimed are defined as follows:

1. In combination:
   a reactor forming an internal reaction chamber and having a side wall forming an opening; and
   a nozzle assembly comprising a mixing means, external of the reactor, and an atomizing nozzle, positioned within the reactor chamber and connected with the mixing means through the opening;
   the mixing means comprising a pipe connected with the atomizing nozzle and having an internal bore, the pipe having first inlet means for introducing a stream of oil under pressure into the pipe bore upstream of the reactor opening and second inlet means for introducing a stream of steam under pressure into the pipe bore upstream of the first inlet means, a pre-conditioning nozzle, having a bore of reducing diameter, positioned transversely of the pipe bore between the first and second inlet means, for accelerating the steam as it passes therethrough so that the steam may contact the oil and produce a flow mixture of steam and oil, and valve means, upstream of the second inlet means, operative to close the pipe bore or enable the introduction of rodding means; and
   the atomizing nozzle comprising a body forming a passageway extending therethrough, said passageway having upstream and downstream ends and comprising the following in sequence, an inlet for introducing the flow mixture, a first contraction section of reducing diameter for accelerating the mixture to supersonic velocity to reduce droplet size by elongation and shear stress, a diffuser section of expanding diameter for allowing the mixture to decelerate and to enlarge the cross-sectional area of the passageway so that sufficient acceleration may be attained in the next contraction section to further reduce droplet size, a second contraction section of reducing diameter for accelerating the mixture with greater acceleration than in the first contraction section to further reduce droplet size by elongation and shear stress and an orifice outlet for discharging the mixture in the form of a jet of relatively fine oil droplets distributed in the steam.

2. The combination as set forth in claim 1 wherein the nozzle passageway is circular in cross-section.

3. The combination as set forth in claim 1 wherein the reactor is a fluidized bed coker.

4. The combination as set forth in claim 2, wherein the reactor is a fluidized bed coker.

5. In combination:
   a reactor forming an internal reaction chamber and having a side wall forming an opening; and
   a nozzle assembly comprising a mixing means, external of the reactor, and an atomizing nozzle, positioned within the reactor chamber and connected with the mixing means through the opening;

the mixing means comprising a pipe connected with the atomizing nozzle and having an internal bore, the pipe having first inlet means for introducing a stream of oil under pressure into the pipe bore upstream of the reactor opening and second inlet means for introducing a stream of steam under pressure into the pipe bore upstream of the first inlet means, a pre-conditioning nozzle, having a bore of reducing diameter, positioned transversely of the pipe bore between the first and second inlet means, for accelerating the steam as it passes therethrough so that the steam may contact the oil and produce a bubbly flow mixture of steam and oil;

the atomizing nozzle comprising a body forming a passageway extending therethrough, said passageway having upstream and downstream ends and comprising the following in sequence, an inlet for introducing the flow mixture, a first contraction section of reducing diameter for accelerating the mixture to reduce droplet size by elongation and shear stress, a diffuser section of expanding diameter for allowing the mixture to decelerate and to enlarge the cross-sectional area of the passageway so that sufficient acceleration may be attained in the next contraction section to further reduce droplet size, a second contraction section of reducing diameter for accelerating the mixture with greater acceleration than in the first contraction section to further reduce droplet size by elongation and shear stress and an orifice outlet for discharging the mixture in the form of a jet of relatively fine oil droplets distributed in the steam.

6. The combination as set forth in claim 5 wherein the nozzle passageway is circular in cross-section and the diffuser section enlarges at an angle of about 3°.

7. The combination as set forth in claim 6 wherein the mixing means comprises valve means, upstream of the second inlet means, operative to close the pipe bore or enable the introduction of rodding means.

8. The combination as set forth in claim 7 wherein the reactor is a fluidized bed coker.

9. A method for atomizing heavy oil to be injected into the reaction chamber of a reactor, comprising:

forming a bubbly flow mixture stream of oil and steam in mixing means external of the reactor; and reducing the size of droplets by passing the mixture stream through a nozzle passageway in the reaction chamber, said passageway comprising, in sequence, an inlet section, a first contraction section, a diffuser section, a second contraction section and an orifice outlet, so that the mixture stream is introduced into the passageway and accelerated in the first contraction section to reduce droplet size by elongation and shear stress, then decelerated and cross-sectionally enlarged in the diffuser section, then accelerated a second time in the second contraction section with greater acceleration than in the first contraction section to further reduce droplet size by elongation and shear stress, and finally discharged through the outlet section into the reactor chamber as a jet of relatively fine oil droplets distributed in steam.

10. The method as set forth in claim 9 wherein the mixture stream is accelerated to supersonic velocity as it passes through the passageway.

11. The method as set forth in claim 9 wherein the oil droplets in the jet have a size in the order of 300 μm.

12. The method as set forth in claim 9 wherein:

the bubbly flow mixture is formed by separately introducing a stream of oil and a stream of steam into the bore of a pipe, the steam being introduced upstream of the oil, accelerating the steam in the pipe and contacting the oil with the accelerated steam to produce the bubbly flow mixture.

13. The method as set forth in claim 10 wherein the oil droplets in the jet have a size in the order of 300 μm.

14. The method as set forth in claim 10 wherein:

the bubbly flow mixture is formed by separately introducing a stream of oil and a stream of steam into the bore of a pipe, the steam being introduced upstream of the oil, accelerating the steam in the pipe and contacting the oil with the accelerated steam to produce the bubbly flow mixture.

\* \* \* \* \*

UNITED STATES PATENT AND TRADEMARK OFFICE
Certificate

Patent No. 6,003,789             Patented: December 21, 1999

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Terence E. Base, London, Canada; Edward W. Chan, Edmonton, Canada; R. Douglas Kennett, Fort McMurray, Canada; Douglas A. Emberley, Fort McMurray, Canada; Thomas William McCracken, Gloucester, Canada; Adam J. Bennett, Ottawa, Canada; and Kevin A. Jonasson, Orleans, Canada.

Signed and Sealed this Twenty-fourth Day of June 2003.

MICHAEL Y. MAR
*Supervisory Patent Examiner*
Art Unit 3752